US010181226B2

(12) United States Patent
Simonazzi

(10) Patent No.: US 10,181,226 B2
(45) Date of Patent: Jan. 15, 2019

(54) TELEMATIC MONITORING SYSTEM FOR VEHICLES

(71) Applicant: Meta System S.p.A., Reggio Emilia (IT)

(72) Inventor: Giuseppe Simonazzi, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 0 days.

(21) Appl. No.: 15/306,127

(22) PCT Filed: Apr. 23, 2015

(86) PCT No.: PCT/IB2015/052972
§ 371 (c)(1),
(2) Date: Oct. 24, 2016

(87) PCT Pub. No.: WO2015/162853
PCT Pub. Date: Oct. 29, 2015

(65) Prior Publication Data

US 2017/0046888 A1 Feb. 16, 2017

(30) Foreign Application Priority Data

Apr. 24, 2014 (IT) ............................ MO2014A0113

(51) Int. Cl.
*B60R 21/0132* (2006.01)
*B60T 8/172* (2006.01)
*G07C 5/08* (2006.01)
*G07C 5/00* (2006.01)

(52) U.S. Cl.
CPC .......... *G07C 5/0816* (2013.01); *G07C 5/008* (2013.01)

(58) Field of Classification Search
CPC .. G07C 5/008; G07C 5/0891; B60R 21/0132; B60R 25/102; G06Q 40/08; G01M 5/00; G01F 9/02; B60K 6/44; B60T 8/172
See application file for complete search history.

(56) References Cited

U.S. PATENT DOCUMENTS 5,825,283 A * 10/1998 Camhi ................. B60R 25/102 340/438
6,373,147 B1 4/2002 Miyaguchi et al.
(Continued)

FOREIGN PATENT DOCUMENTS

| | | |
|---|---|---|
| EP | 2012276 | 1/2009 |
| GB | 2471727 | 1/2011 |
| WO | WO 2015/162583 | 10/2015 |

OTHER PUBLICATIONS

International Search Report and the Written Opinion dated Jul. 28, 2015 From the International Searching Authority Re. Application No. PCT/IB2015/052972 and Its Translation Into English.

*Primary Examiner* — Yuri Kan

(57) ABSTRACT

The telematic monitoring system (1) for vehicles comprise a management and control unit (2) installed on a vehicle and capable of managing and controlling information relating to the vehicle (V) itself, a remote processing unit (3) for processing said information, a communication unit (4) installed on the vehicle (V), operatively connected to the management and control unit (2) and capable of communicating with the remote processing unit (3), a first device (6) operatively connected to the management and control unit (2), having first measurement means (7) for measuring instantaneous acceleration and first integral fastening means (8) to a front glass (A) of the compartment of the vehicle (V), a second device (9) operatively connected to the management and control unit (2), having second measurement means (10) for measuring instantaneous acceleration and
(Continued)

second integral fastening means (11) to a rear glass (P) of the compartment of the vehicle (V), processing means (12) of first acceleration data (D1) and of second acceleration data (D2) coming from the first device (6) and from the second device (9) respectively, for the processing of the way a bump occurs on/of the vehicle (V).

10 Claims, 3 Drawing Sheets

(56) References Cited

U.S. PATENT DOCUMENTS

| | | | | |
|---|---|---|---|---|
| 6,427,130 | B1 * | 7/2002 | Mergenthaler .......... | B60T 8/172 702/127 |
| 2002/0037707 | A1 * | 3/2002 | Yoshioka .............. | B60R 25/102 455/404.2 |
| 2006/0100762 | A1 * | 5/2006 | Matsunaga ......... | B60R 21/0132 701/45 |
| 2007/0285256 | A1 * | 12/2007 | Batra ...................... | G01M 5/00 340/572.8 |
| 2007/0291116 | A1 * | 12/2007 | Creus Sola .......... | G07C 5/0891 348/149 |
| 2008/0154472 | A1 * | 6/2008 | Okuda ..................... | B60K 6/44 701/93 |
| 2010/0250021 | A1 | 9/2010 | Cook et al. | |
| 2011/0112719 | A1 * | 5/2011 | Marumoto ................ | G01F 9/02 701/33.4 |
| 2013/0096731 | A1 | 4/2013 | Tamari et al. | |
| 2014/0046701 | A1 | 2/2014 | Steinberg et al. | |
| 2015/0019266 | A1 * | 1/2015 | Stempora ............... | G06Q 40/08 705/4 |

* cited by examiner

TELEMATIC MONITORING SYSTEM FOR VEHICLES

RELATED APPLICATIONS

This application is a National Phase of PCT Patent Application No. PCT/IB2015/052972 having International filing date of Apr. 23, 2015, which claims the benefit of priority of Italian Patent Application No. MO2014A000113 filed on Apr. 24, 2014. The contents of the above applications are all incorporated by reference as if fully set forth herein in their entirety.

FIELD AND BACKGROUND OF THE INVENTION

The present invention relates to a telematic monitoring system for vehicles.

Telematic appliances are known which, once installed on board a vehicle, are able to detect the modes of use of the vehicle itself over time.

Such appliances find application, e.g. in the insurance field, for the determination of customized rates on the basis of the actual use of the vehicle, in the environmental field, for the real-time detection of the polluting emissions of a vehicle, or in the vehicle rental management, in order to achieve greater automation of procedures for the pricing, pickup and delivery of vehicles.

The appliances of known type generally comprise a local exchange which can be installed on board the vehicle, inside the compartment, and connectable to the electronics of the vehicle itself.

Such appliances also comprise a radio-wave device, of the type commonly used in the mobile phone field such as, e.g., a GSM, GPRS, UMTS transceiver or the like. The radio-wave device, in particular, supports the sending of information gathered by the appliance to a remote data processing and storage unit.

Eventually, the radio-wave device is employed for receiving, from the remote unit, updates of the management software and/or suitable parameterizations of the appliance on board the vehicle.

These appliances generally also comprise a satellite receiver, the type of a GPS receiver or the like, which allows for the localization of the vehicle using the detected coordinates of latitude, longitude and, possibly, altitude.

In practice, the operation of the appliance involves the gathering, at regular time intervals, of information relating to the position of the vehicle via the GPS receiver and the subsequent transmission of such information to the remote unit by means of the radio-wave device.

The information gathered this way by the remote unit is then processed for the determination of useful data for the specific area of application.

More information can be gathered by the appliance through the use of additional devices such as, e.g., an accelerometer mounted on the vehicle and able to detect bumps and sudden accelerations and decelerations.

The accelerometer, in particular, can be employed in the insurance field to determine the way an accident occurs and, therefore, the responsibilities involved with it.

These appliances of known type, however, are susceptible to improvements, aimed in particular to improve the quality and accuracy of the detected information.

Additionally, the installation of the appliance on the vehicle is often long and complex.

In general, in fact, the local exchange must be installed inside the compartment of the vehicle, in correspondence of the dashboard, and must be suitably connected to the electronics of the vehicle.

This installation procedure of the local exchange requires a long time thus increasing, accordingly, the related labor costs.

SUMMARY OF THE INVENTION

The main aim of the present invention is to provide a telematic monitoring system for vehicles that enables to detect accurate and reliable information.

Another object of the present invention is to provide a telematic monitoring system for vehicles which is easy and quick to install.

Another object of the present invention is to provide a telematic monitoring system for vehicles which allows to overcome the mentioned drawbacks of the prior art within the framework of a simple, rational, easy, effective to use as well as affordable solution.

The above mentioned objects are achieved by the present telematic monitoring system according to the characteristics described in claim 1.

BRIEF DESCRIPTION OF THE SEVERAL VIEWS OF THE DRAWINGS

Other characteristics and advantages of the present invention will become better evident from the description of a preferred, but not exclusive embodiment of a telematic monitoring system for vehicles, illustrated by way of an indicative, but not limitative example in the accompanying drawings in which.

DESCRIPTION OF SPECIFIC EMBODIMENTS OF THE INVENTION

Figure 1:
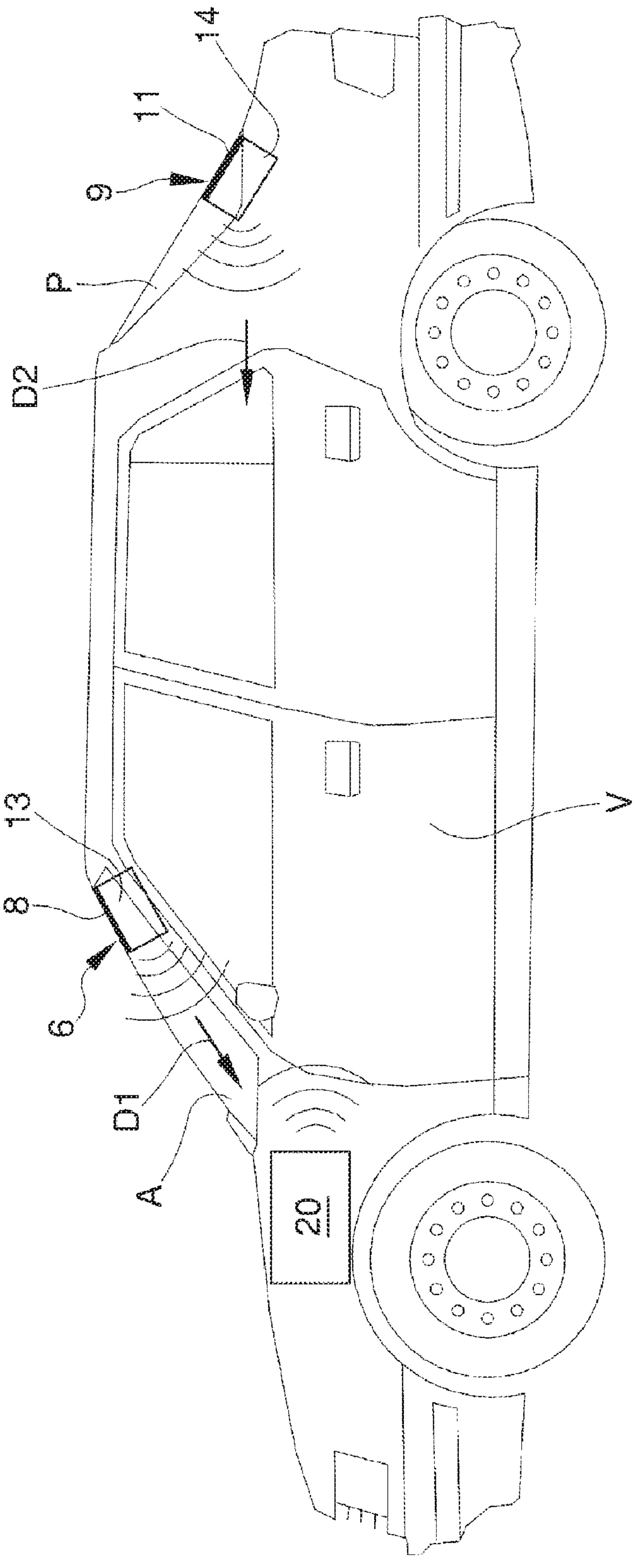
FIG. 1 is a schematic side view showing the installation of a possible first embodiment of the system according to the invention on a motor vehicle.
Figure 2:
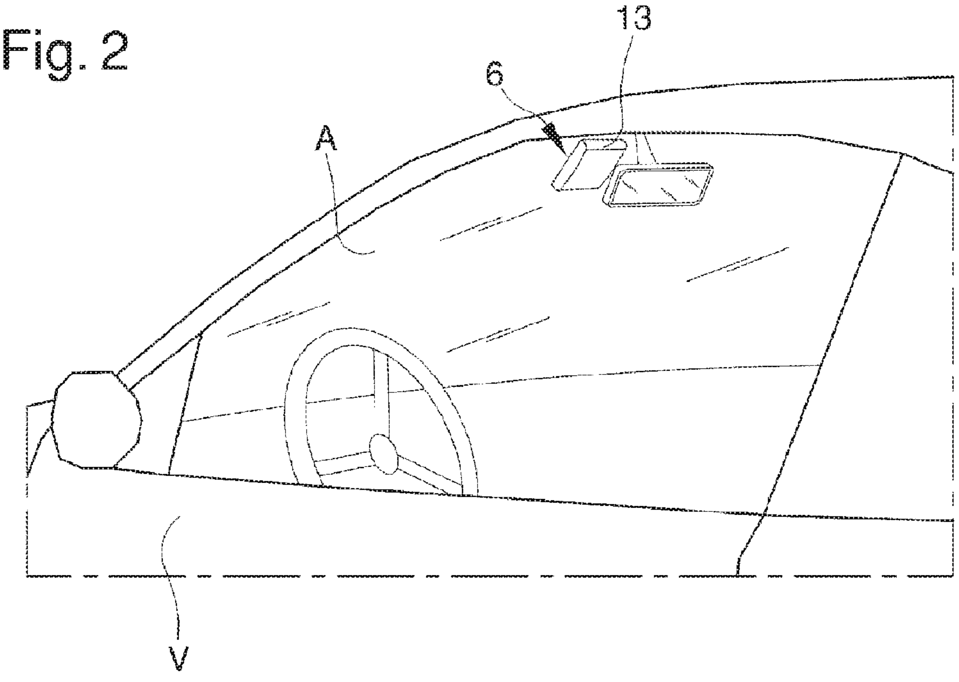
FIG. 2 is a view showing a first device of the system according to the invention installed on the windshield of the motor vehicle.
Figure 3:
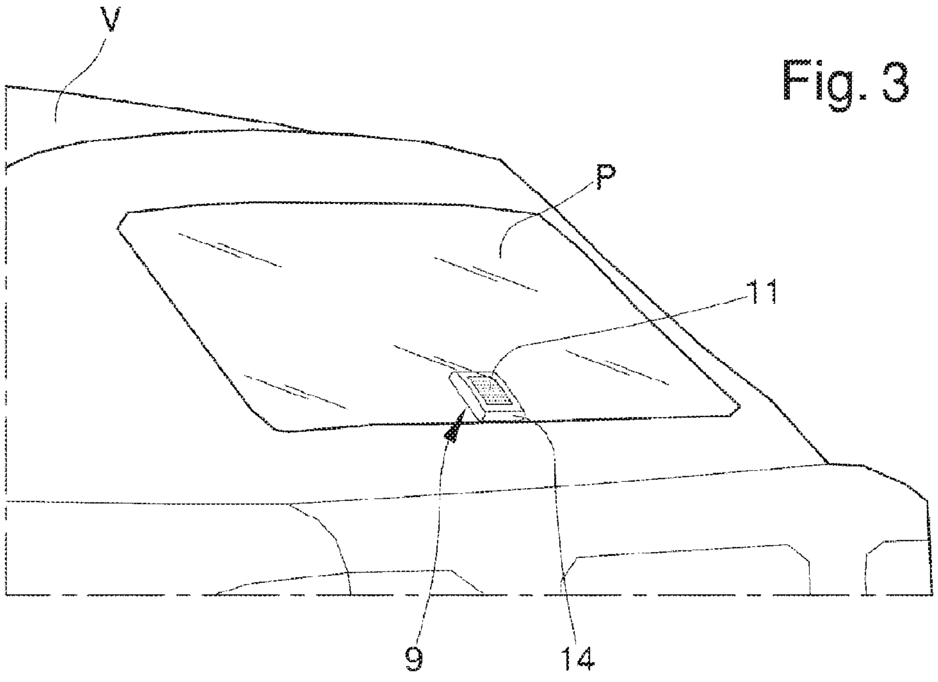
FIG. 3 is a view showing a second device of the system according to the invention installed on the rear window of the vehicle.

With particular reference to such illustrations, globally indicated with reference number 1 is a telematic monitoring system for vehicles, which can be used to detect the modes of use of the vehicle itself over time, e.g. in the insurance field, for the determination of customized rates on the basis of the actual use of the vehicle and for the determination of accidents or bumps, even slight, in the environmental field, for the real-time detection of the polluting emissions of a vehicle, or in the vehicle rental management, in order to achieve greater automation of procedures for the pricing, pickup and delivery of vehicles.

The system 1 comprises a management and control unit 2 installed on a vehicle V and able to manage and control information relating to the vehicle itself, a remote processing unit 3 able to process such information, and a communication unit 4 installed on the vehicle V, operatively connected to the management and control unit 2 and able to communicate with the remote processing unit 3.

The communication unit 4 can comprise, e.g., a transmitter and/or a receiver operating with mobile phone protocols (GSM, GPRS, UMTS or the like) and an antenna 5 for transmitting/receiving radio frequency signals to/from the remote processing unit 3.

Advantageously, the system 1 comprises:

- a first device 6 operatively connected to the management and control unit 2, having first measurement means 7 for measuring the instantaneous acceleration and first integral fastening means 8 able to allow the integral fastening of the first device itself to the front glass A, inside the compartment of the vehicle V;
- a second device 9 operatively connected to the management and control unit 2, having second measurement means 10 for measuring the instantaneous acceleration and second integral fastening means 11 able to allow the integral fastening of the second device itself to the rear glass P, inside the compartment of the vehicle.

The system 1 also comprises processing means 12 of first acceleration data D1 and of second acceleration data D2 coming from the first device 6 and from the second device 9 respectively, for processing the way a bump occurs on/of the vehicle V.

Figure 4:
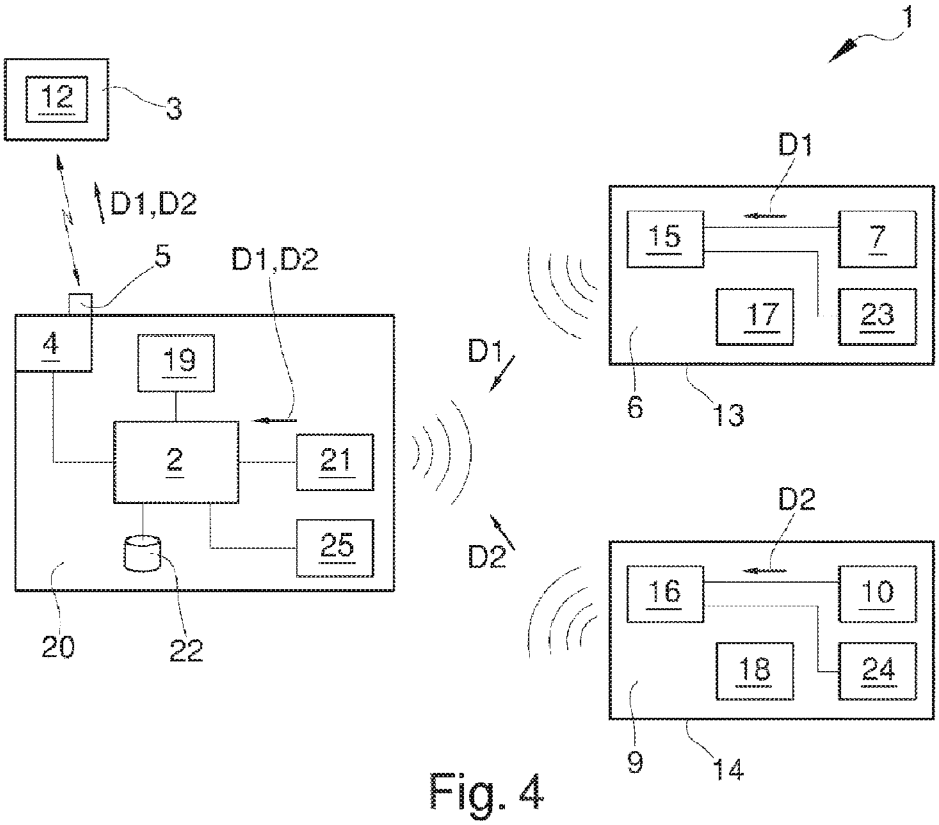
FIG. 4 is a block diagram of the possible first embodiment of the system according to the invention of FIG. 1.
Figure 5:
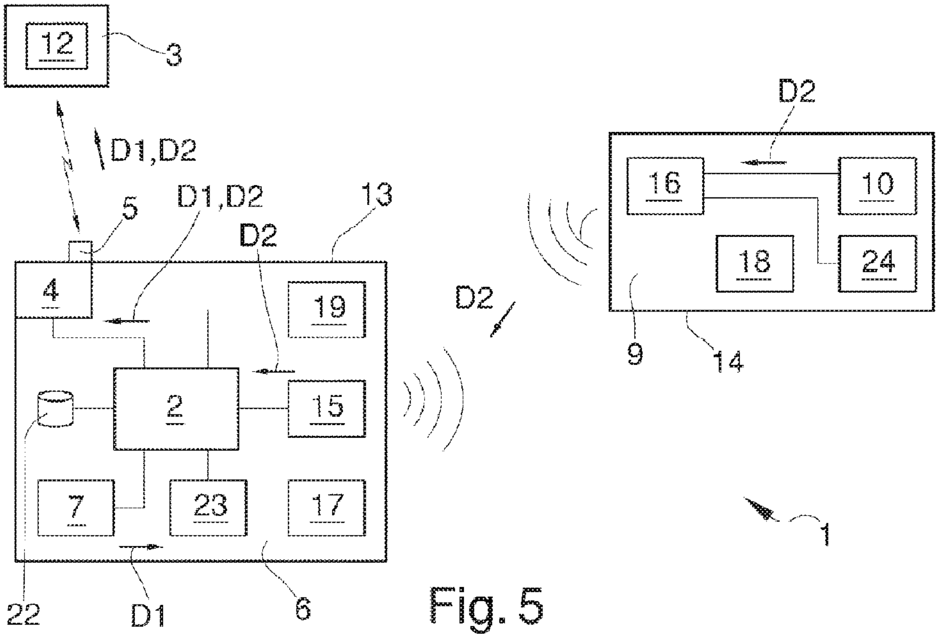
FIG. 5 is a block diagram of a possible second embodiment of the system according to the invention.

In particular, the processing means 12 can be constituted by a suitable software program and/or calculation algorithm implemented in the management and control unit 2 on board the vehicle V or alternatively, as illustrated in the examples of FIG. 4 and FIG. 5, implemented in the remote processing unit 3.

Advantageously, the use of a first device 6 and of a second device 9 separate from one another, having respective first and second measurement means 7 and 10 for measuring the instantaneous acceleration, together with the integral fastening of such devices to the front glass A (windscreen) and to the rear glass P (defroster) respectively, allow to perform measurements of the acceleration in two distinct and well-defined points of the vehicle V, thus gathering first acceleration data D1 and second acceleration data D2 that, once processed by the processing means 12, provide accurate and reliable information on the way a bump occurs on/of the vehicle V.

The first device 6 comprises a first container body 13 having first integral fastening means 8 and able to house the first measurement means 7 for measuring the instantaneous acceleration.

Similarly, the second device 9 comprises a second container body 14 having second integral fastening means 11 and able to house the second measurement means 10 for measuring the instantaneous acceleration.

Preferably, the first measurement means 7 and the second measurement means 10 are made up, respectively, of a first triaxial accelerometer and of a second triaxial accelerometer.

Alternative embodiments cannot however be ruled out wherein, for example, the first measurement means 7 and the second measurement means 10 comprise a different number of biaxial or triaxial accelerometers and/or different sensor devices, such as one or more gyroscopes or similar devices.

Preferably, the first integral fastening means 8 and the second integral fastening means 11 are made by means of one or more adhesive layers associable with the front glass A and with the rear glass P.

Alternative embodiments cannot however be ruled out wherein, e.g., the first integral fastening means 8 and the second integral fastening means 11 are made up of mechanical anchoring means, the type of one or more suction cups or the like. Advantageously, furthermore, the first and the second device 6 and 9 comprise a first and a second radio frequency transmission/receiving unit 15 and 16 able to transmit/receive radio frequency signals to/from the management and control unit 2. For example, the first and the second radio frequency transmission/receiving unit 15 and 16 can be constituted by short-range radio frequency transceivers, the type of Bluetooth, WiFi transceivers or the like.

Furthermore, each of the devices 6 and 9 can have a respective first and second inner rechargeable battery 17 and 18.

In practice, therefore, the realization of the first and of the second device 6 and 9 inside respective containers 13 and 14 fixable to the front glass A and to the rear glass P, together with the fact that these devices have respective radio frequency transmission/receiving units 15 and 16 and respective rechargeable batteries 17 and 18, allow a simple and quick installation of the devices themselves on board a vehicle V.

Conveniently, each of the devices 6 and 9 can have a suitable LED able to provide indications on the charge status of the rechargeable batteries 17 and 18.

Conveniently, the system 1 can also comprise a localization unit 19 for localizing the position of the vehicle V, preferably having a satellite signal receiver.

According to a possible first embodiment, schematically shown in FIG. 1 and in the diagram of FIG. 4, the system 1 comprises a local exchange 20 installable on board the vehicle V, having the management and control unit 2, the communication unit 4, the localization unit 19 and an additional third radio frequency transmission/receiving unit 21 able to transmit/receive radio frequency signals to/from the first and second devices 6 and 9.

Conveniently, the local exchange 20 can also have respective third measurement means 25 constituted by a third triaxial accelerometer.

Conveniently, according to a preferred solution, the local exchange 20 can be fastened to the electric battery of a vehicle V and can be electrically connected directly to the electric poles P+ and P− of the battery itself.

With reference to a possible second embodiment, schematically shown in FIG. 5, the management and control unit 2, the communication unit 4 and the localization unit 19 can be made integral within one of the devices 6 and 9 themselves (in the example illustrated in the figure within the first device 6).

In this way, the installation operations of system 1 on the vehicle are further simplified and can be performed quickly even by unskilled personnel.

Conveniently, the system 1 can comprise at least a storage unit 22 able to store the information relating to the vehicle V.

In particular, one or more storage units 22 can be integrated inside the local exchange 20, one or both devices 6 and 9 and/or the remote processing unit 3. Advantageously, the first device 6 and the second device 9 comprise first and second detection means 23 and 24 respectively, for detecting a bump on the front glass A and on the rear glass P.

In particular, said first and second detection means 23 and 24 can comprise, e.g., one or more vibration sensors or one or more sound sensors.

The presence of these first and second detection means 23 and 24 allows, therefore, to detect any bump on the front glass A and on the rear glass P and therefore allows to detect events which are not normally detected such as, e.g., the impact of a stone on the front glass A.

Conveniently, the first device 6 can have a suitable emergency push button able to send, once activated, an emergency signal to the remote unit (as defined by the regulations on eCall).

It has in practice been found how the described invention achieves the intended objects.

What is claimed is:

1. A telematic monitoring system (1) for vehicles, comprising:

at least a management and control unit (2) installed on a vehicle and capable of managing and controlling information relating to the vehicle (V) itself, at least a remote processing unit (3) for processing said information, at least a communication unit (4) installed on said vehicle (V), operatively, connected to said management and control unit (2) and capable of communicating with said remote processing unit (3), at least a first device (6) operatively connected to said management and control unit (2), the first device (6) is positioned in a first distinct location on a front glass (A) of the vehicle (V) and configured for gathering first acceleration data (D1) by measuring instantaneous acceleration, at least a second device (9) operatively connected to said management and control unit (2), the second device (9) is positioned in a second distinct location on a rear glass (P) of the vehicle (V) and configured for gathering second acceleration data (D1) by measuring instantaneous acceleration, and processing means (12) for processing said first acceleration data (D1) and said second acceleration data (D2) coming from said first device (6) and from said second device (9) respectively, for providing information on an occurrence of a bump on and/or of said vehicle (V) by operating a calculation algorithm that calculates an accurate information based on both said first acceleration data (D1) and said second acceleration data (D2);

wherein said first device (6) comprises a first integral fastener (8) for fastening the first device (6) to said front glass (A) of a compartment of said vehicle (V), wherein said second device (9) comprises a second integral fastener (11) for fastening the second device (9) to said rear glass (P) of the compartment of said vehicle (V), and wherein one of said first device (6) and said second device (9) comprises a radio frequency transmission/receiving unit (15, 16) for transmitting/receiving radio frequency signals to/from said management and control unit (2);

wherein the other of said first device (6) and said second device (9) comprises said management and control unit (2) and said communication unit (4).

2. The system (1) according to claim 1, wherein said first device (6) comprises at least a first container body (13), fastener (8) capable of housing at least said first control unit (2) for measuring instantaneous acceleration.

3. The system (1) according to claim 2, wherein said second device (9) comprises at least a second container body (14) having said second integral fastener (11) and capable for measuring instantaneous acceleration.

4. The system (1) according to claim 1, wherein at least one of said first device (6) and said second device (9) has an inner rechargeable battery (17, 18).

5. The system (1) according to claim 1, wherein said first integral fastener (8) and/or said second integral fastener (11) comprise at least an adhesive layer associable with said front glass (A) and/or with said rear glass (P).

6. The system (1) according to claim 1, wherein said first integral fastener (8) and/or said second integral fastener (11) are of the type of mechanical anchoring.

7. The system (1) according to claim 1, wherein it comprises at least a localization unit (19) for localizing the position of said vehicle (V).

8. The system (1) according to claim 1, wherein it comprises at least a storage unit (22) for storing said information relating to the vehicle (V).

9. The system according to claim 1, wherein at least one of said first device (6) and said second device (9) comprises at least one sensor (23, 24) for detecting the bump on said front glass (A) and/or on said rear glass (P).

10. The system (1) according to claim 9, wherein said at least one sensor (23, 24) comprise at least a vibration sensor and/or at least a sound sensor.

* * * * *